United States Patent [19]
Nicole

[11] Patent Number: 5,736,730
[45] Date of Patent: Apr. 7, 1998

[54] DEVICE FOR RECEIVING ELECTROMAGNETIC SIGNALS WITH AN ENERGY CORRECTION MEANS

[75] Inventor: Pierre Nicole, Saint Cloud, France

[73] Assignee: Dassault Electronique, Saint Cloud Cedex, France

[21] Appl. No.: 595,004

[22] Filed: Jan. 31, 1996

[30] Foreign Application Priority Data

Feb. 9, 1995 [FR] France ................................ 95 01510

[51] Int. Cl.[6] ................................................ G01J 1/20
[52] U.S. Cl. ........................ 250/203.1; 250/216; 359/251
[58] Field of Search ................................ 250/203.1, 204, 250/203.2, 203.4, 203.6, 206.1, 206.2, 236, 216; 359/251, 283, 217, 221; 244/159, 3.23, 3.24, 3.16

[56] References Cited

U.S. PATENT DOCUMENTS

| | | | |
|---|---|---|---|
| 5,012,081 | 4/1991 | Jungwirth et al. | 250/203.6 |
| 5,029,956 | 7/1991 | Takanashi et al. | 250/236 |
| 5,173,810 | 12/1992 | Yamakawa | 250/216 |

FOREIGN PATENT DOCUMENTS

| | | |
|---|---|---|
| 0607906 | 7/1994 | European Pat. Off. . |
| 92 22150 | 12/1992 | France . |
| 2690584 | 10/1993 | France . |

Primary Examiner—Que Le
Attorney, Agent, or Firm—Pollock, Vande Sande & Priddy

[57] ABSTRACT

A receiver device is intended to detect a beam of electromagnetic entry signals of a known geometry, arriving at a variable entry angle of incidence. It comprises an optical lens, comprising at least one aspherical surface capable of correcting the geometry of an incident beam according to a correction formula chosen in accordance with the entry angle of incidence, for transforming it into an incident beam and applying it to a quadratic detector. This tends to suppress the divergences of the energy received by the detector cording to the angle of incidence, and makes it possible to render substantially constant the signal-to-noise ratio of the detection and the detected signal, irrespective of the entry angle of incidence of the incident entry beam.

8 Claims, 2 Drawing Sheets

DEVICE FOR RECEIVING ELECTROMAGNETIC SIGNALS WITH AN ENERGY CORRECTION MEANS

FIELD OF THE INVENTION

The invention concerns the detection of electromagnetic waves, in particular optical waves, capable of striking a detector along different angles of incidence.

This situation is encountered, for example, in the following case: a satellite which revolves round the earth in a low orbit is provided with a detector, set to the instantaneous terrestrial vertical, which receives series of short pulses from diverse terrestrial stations for the purpose of temporal measurements, for example. Various factors (to which we will refer below) cause either the signal-to-noise ratio to vary with the angle of incidence on the sensor, or the signal level to vary according to the angle of incidence, which is prejudicial.

OBJECTS OF THE INVENTION

The principal object of the invention is to provide a solution for this problem.

Another object of the invention, which will be described below, is to provide a device capable of detecting beams of electromagnetic signals independently of their angle of incidence on the detector.

SUMMARY OF THE INVENTION

An with an electromagnetic signal receiving device intended to detect a beam of incoming electromagnetic signals of a known geometry arriving at a variable entry angle of incidence. The device includes detector having a sensitive detection area and a main detection axis serving as a reference for the entry angle of incidence, and means for transmitting to this detector an incident beam coming from the entry beam in a specified angular range.

In this device, the invention provides, on the one hand, for the use of a quadratic detector of the energy of the incident beam on a given sensitive area and, on the other hand, for providing the transmission means with a correction means capable of correcting the geometry of the beam applied to the detector according to a correction formula chosen in accordance with the entry angle of incidence and tending to reduce the divergences of the received energy according to this angle of incidence.

Thus the signal-to-noise ratio of the detection is rendered substantially constant irrespective of the entry angle of incidence of the incident beam. In other words, the correction formula is capable of rendering the probability of detection of the electromagnetic signals of the incident entry beam by the sensitive area of the detector independent of the entry angle of incidence, or of rendering the detected signal independent of the angle of incidence.

Preferably, the electromagnetic signals of the incident entry beam have frequencies in the optical range.

According to another characteristic of the invention, the correction means is an optical lens having surfaces of respective profiles predetermined according to the chosen correction formula.

In this way, the correction brought to bear on the paths of the electromagnetic signals is purely passive, and it does not require consuming energy for this purpose.

Moreover, such a lens may serve as a filter, since the profiles of its surfaces are chosen according to the characteristic of the beams to be detected.

According to yet another characteristic of the invention, the lens has at least one aspherical surface orientated towards the sensitive area of the detector.

By means of such an aspherical surface, it is possible to cause a proportion of the signals, of a beam arriving with an incidence normal to the sensitive area, to be diverted outside this sensitive area of the detector, and to cause a proportion of the signals of a beam arriving at a large angle of incidence to converge towards the sensitive area of the detector.

By definition, the angle of incidence is indicated relative to the normal to the sensitive detection area.

Thus, since the ratio between the cross-section of the beam received and the sensitive area of the detector is very large with a small incidence, access to the detector is prohibited to a proportion of those signals which were capable of reaching the detector, while with a grazing incidence, access to the detector is forced for a proportion of those signals which were previously unable to reach it.

Thus, the greater the angle of incidence, the more reinforced the detected intensity of the entry beams.

In one embodiment of the invention, the lens comprises an aspherical surface orientated towards the sensitive area of the detector, and a planar surface on the opposite side of the aspherical surface.

Thus the lens comprises an aspherical surface for the correction of the path and a planar surface serving as protection against various spurious electromagnetic emissions.

BRIEF DESCRIPTION OF THE DRAWINGS

Other characteristic and advantages of the invention will become apparent from an examination of the following detailed description and the attached drawings, wherein.

DETAILED DESCRIPTION OF THE PREFERRED MODES

Figure 1:
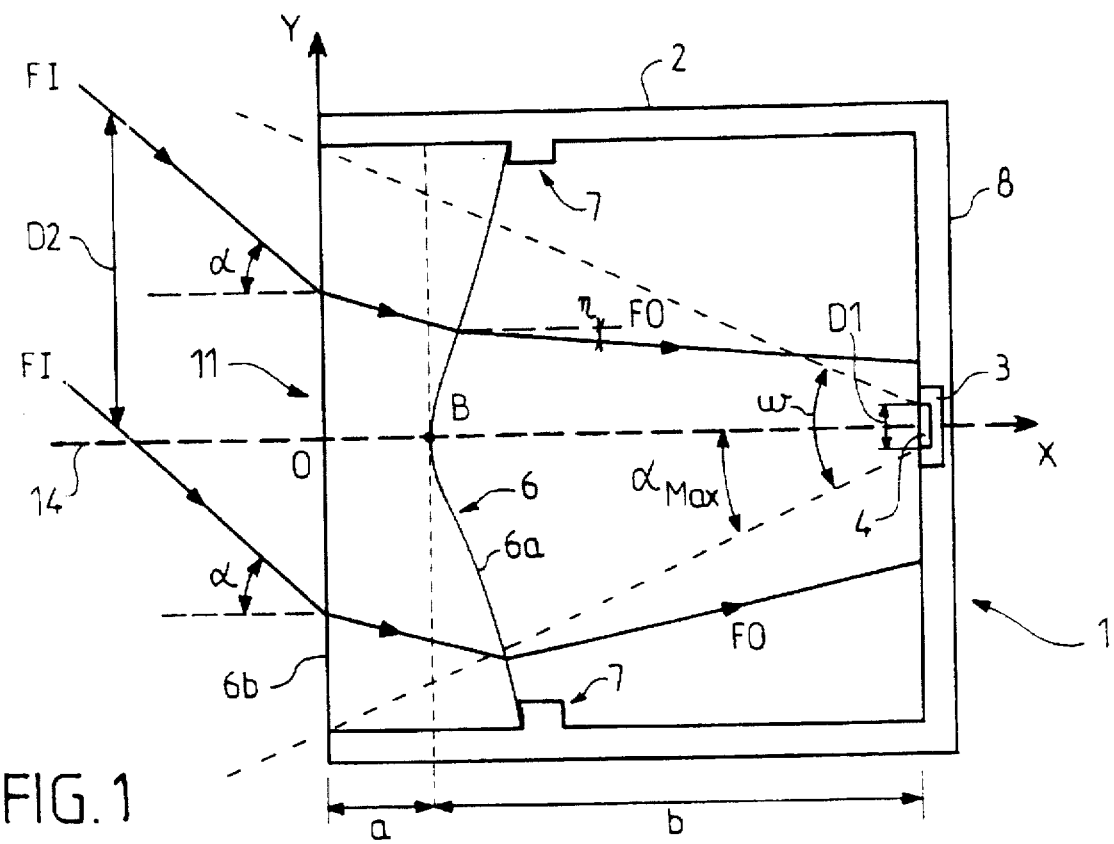
FIG. 1 is a cross-sectional view of the receiving device in accordance with the invention, which illustrates the action of the correction means on an incident beam arriving at an angle of incidence of approximately 30°.

A device for receiving electromagnetic signals, in particular for the detection of a beam of electromagnetic signals of a known geometry, arriving at a variable entry angle of incidence, require the signal-to-noise ratio of each measurement to be substantially constant, or the detected signal to be substantially constant.

What is here to be understood by the "known geometry" of the beam is in essence its divergence.

Such detectors are usually used in devices for measuring the location of moving objects and of satellites, in particular, so as to ensure their tracking in real time by stations on the ground.

The beams transmitted by these stations contain electromagnetic wave trains in the optical range, having a duration between 10 ps and 100 ps. Consequently, the beam is collimated, and it therefore has a very low divergence (a fraction of the digital aperture of the optical system).

It is therefore indispensable for the transmitter of a station to follow the known trajectory of the satellite so that the main transmission axis is always be substantially orientated towards the satellite. In the known devices, this was accomplished by automatic control of the transmitter.

In these same known devices, the detector is installed in a position fixed onto the satellite, so that its main detection axis should be constantly orientated along the vertical of the ground location passed over in flight. It follows therefrom that the angle of incidence of the beam relative to the detector varies with the course of time.

Now although the detected satellite-to-earth signal is substantially constant, on the other hand, the detected satellite-to-station signal varies, in the course of time, just like the angle of incidence of the beam transmitted by the station. The more this satellite-to-station distance increases, the thicker the atmospheric layer is which the beam has to pass through, and therefore the intensity of the beam decreases even more by an absorption and/or diffusion effect by, or on, the molecules which occupy the layer.

Moreover, the characteristics of the transmitted beam (temporal range, intensity, divergence) are not identical from one transmitting station to another.

Consequently, the intensity of the electromagnetic signals which are detected by the satellite depends heavily on their angle of incidence on the detector.

The value delivered by the detector on reception of the beam may vary in the course of time by a factor of 100 when one passes from a position where the satellite is above the station, to a position where it is approximately 5° above the horizon line of the station.

Such a variation heavily penalizes the electronic equipment on board the satellite, because it directly influences the signal-to-noise ratio of the signal and implies that the amplification chain coupled to the detector supports a very considerable dynamic range (typically 100 dB).

Now the signal-to-noise ratio of the detected beam will affect the result of the measurement of the location. The higher it is, the better the measurement will be.

Thus the known devices cannot ensure a high and substantially constant signal-to-noise ratio irrespective of the angle of incidence of the transmitted beams.

Reference will first be made to FIG. 1 which illustrates a device 1 for receiving electromagnetic signals, comprising a transmission means 2 capable of receiving an incident beam, termed "entry" beam, comprised in an angular range ($\omega$) of approximately 60°, for modifying it and transmitting it to a detector 3 in the form of an incident beam FO with a geometry different from that of the entry beam FI.

The detector 3 is a quadratic detector intended to detect the energy of the incident beam FO on a sensitive area 4.

The transmission means 2 comprises a support provided with a window 11, which can be either an opening cut in the support, or a protective screen made of a treated material if it is intended to protect the detector and/or to filter the signals to be transmitted to the detector 3.

Down the line from the window, and ahead of the detector 3, there are accommodated in accordance with the invention a lens 6 which are held in position inside the support, for example, by means of fixing tabs 7.

The lens 6 has dimensions of the order of a few centimeters (typically 3 to 5 cm), while the sensitive area 4 of the detector is of the order of a few tens of micrometres (typically 200 μm). This is a configuration known by the one skilled in the art as a "small detector".

This arrangement has two important advantages:
it makes it possible to provide a fundamental simplifying hypothesis for the calculation of the respective profiles of the surfaces of the lens, and
it allows the costs of manufacturing the lens to be reduced considerably.

The detector 3 is also fixed on a plate 8 of the support.

Thus the lens 6 and the detector 3 are immovable with respect to each other, which is indispensable as will be seen below.

The detector 3 has a main detection axis 14 indicated in dashes by the axis OX that is perpendicular to the sensitive detection area 4. This axis 14 serves as reference for the incident entry angle ($\alpha$). In the following description, the angles of incidence of the beams will always be indicated relative to this main detection axis 14.

In the known devices, and in the case of a "small detector", the probability that the electromagnetic signals of an incident entry beam FI will reach the detector 3 does not, in practice, depend on the mean entry angle of incidence ($\alpha$) if $\alpha$ is less than or equal to ($\omega/2$).

In a device in accordance with the invention, it is possible to work with angles of incidence ($\alpha$) greater than ($\omega/2$). Indeed, by intercepting the incident entry beam FI with a simple planar diopter lens with a refractory index greater than the index of free space, it is possible to modify the angle of incidence by reducing it. This is the effect described by the Descartes-Snell laws as:

$$(n1 \cdot \sin(i1) = n2 \cdot \sin(i2)).$$

However, a simple planar diopter lens is not be capable of solving the particular problem posed in the introduction, that is to say, to render the intensity of the detected beams substantially independent of the angle of incidence.

Applicant has noticed that it was possible to achieve this object by using a lens 6 whereof at least one of its two surfaces has a preferably concave aspherical profile 6a, and predetermined according to:
first, the known geometry of the incident entry beam FI and its frequency,
second the geometry of the sensitive detection area 4, and
third the absorption law for the entry beam FI.

An aspherical surface is substantially equivalent to a succession of surfaces with alternately positive then negative curvatures.

This use of an aspherical lens as an energy corrector goes against the ideas widely accepted in transmission-reception field. Indeed, until now, the lenses of this type have been used either for collimating a beam or for correcting aberrations of a geometrical and/or a chromatic type introduced by other elements situated ahead of the detection.

The number of aspherical surfaces on the lens will depend on the number of variable parameters in the set constituted by the transmitter element and the element comprising the receiver in accordance with the invention.

In the following description, there will be described an example of the use of the device in accordance with the invention which requires a lens comprising only a single aspherical surface.

This is in particular the case for a receiving satellite in a low orbit around a star and a transmitting station fixed on the ground. In this example, the receiving element (satellite) is displaced relative to the transmitting element (station on the ground) in a two-dimensional reference system (planar space), each element being defined in this reference system by two spherical coordinates (r, $\theta$), the modulus r being constant and $\theta$ being variable.

Figure 2:
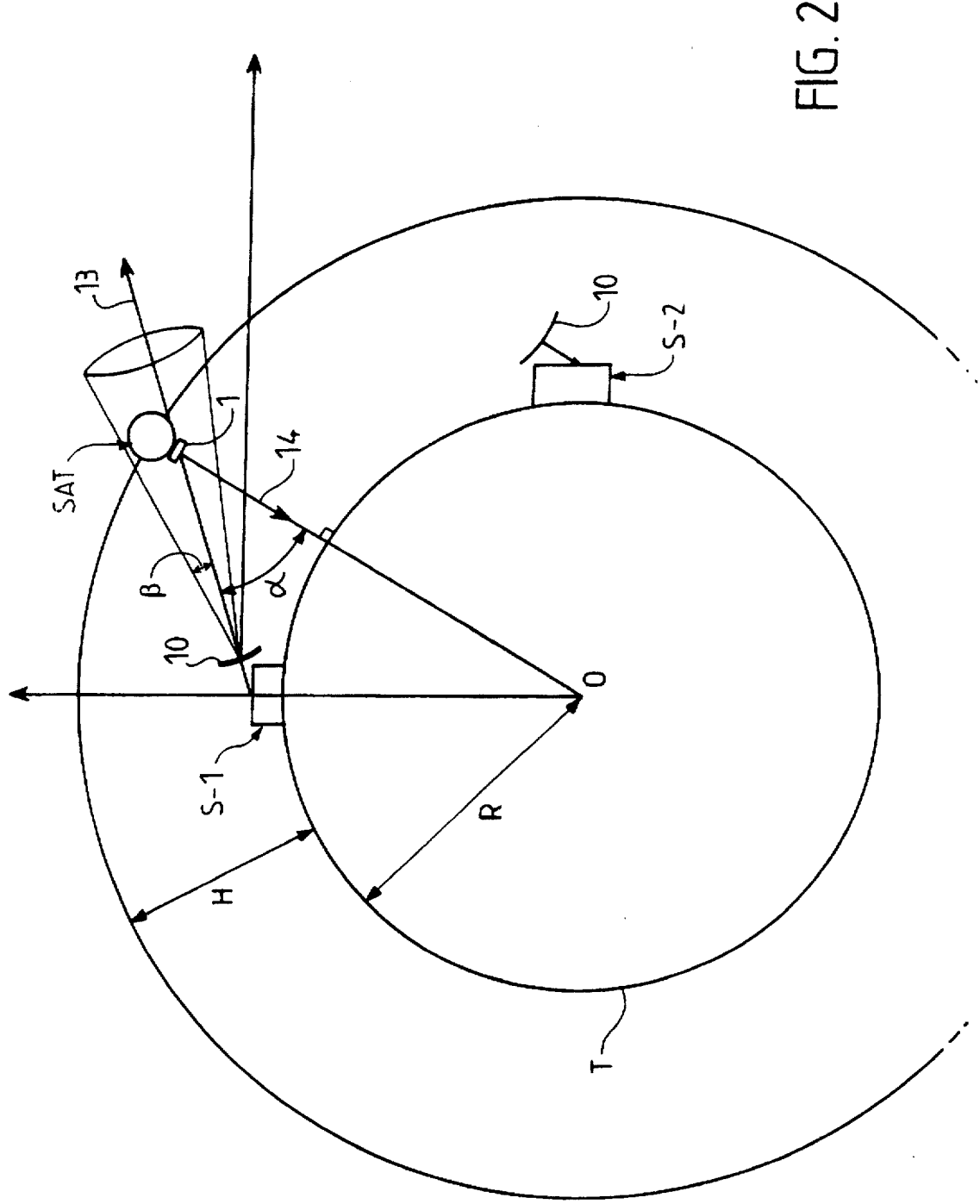
FIG. 2 is a diagram illustrating the use of the receiving device in accordance with the invention, in a particular case.

The center of the star serves as the origin of the fixed reference system, the station is fixed in the reference system, and the moving object describes a uniform circular orbit in the plane defined by the said reference system. This particular case is illustrated in FIG. 2 for r=R+H, where R is the radius of the star T and H the altitude at which the satellite revolves relative to the ground.

In this particular case, a lens having a first surface of an aspherical profile and a second surface of a planar profile is used.

Preferably, the aspherical profile 6a is preferably opposite the sensitive detection area 4, while the planar surface 6b is orientated towards the transmitter of the entry beam FI.

This configuration makes it possible to protect the aspherical surface 6a which is the most important element of the device.

Figure 3:
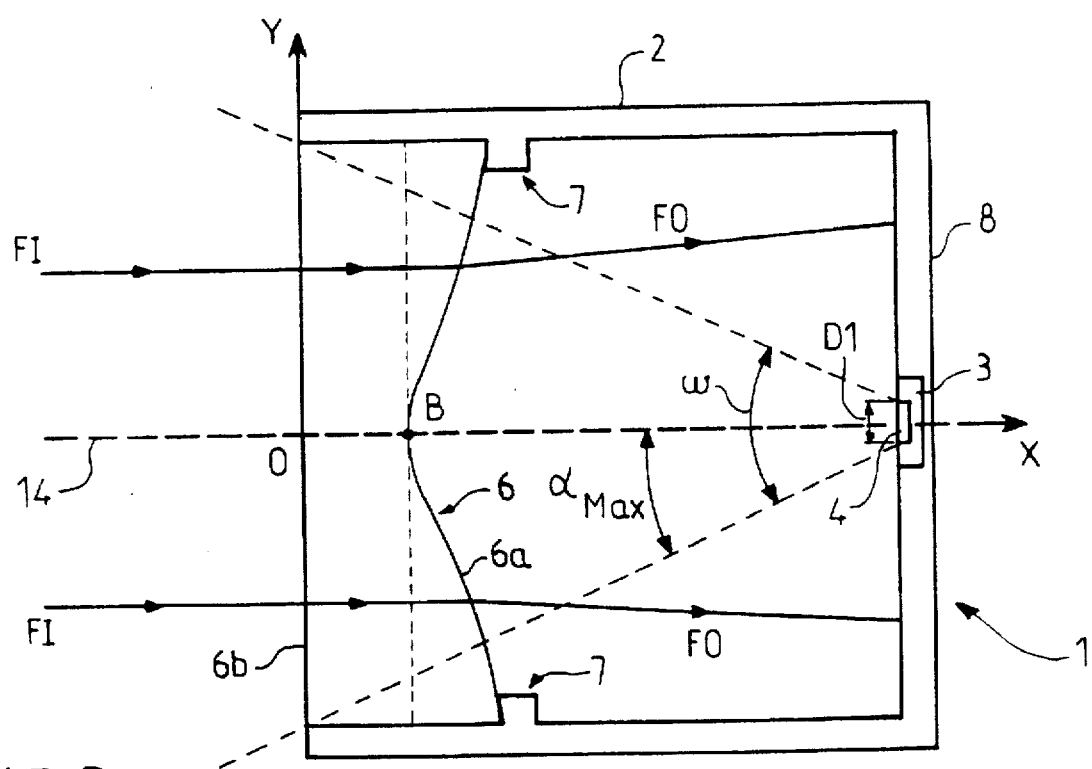
FIG. 3 is a cross-sectional view of the receiving device in accordance with the invention which illustrates the action of the correction means on an incident beam arriving at an angle of incidence that is substantially zero.

The profile of an aspherical surface is calculated by means of the general equations given in Annex I, with reference to FIGS. 1 to 3.

First of all, the following two hypotheses are stipulated:
a) the diameter D1 of the sensitive area 4 of the detector 3 is very small as compared with the diameter D2 of the lens; and
b) the orbit of the satellite SAT is assumed to be circular.

A local reference system (O, x, y) is defined on the satellite, centered on the center point O of the lens 6.

The direction Ox defines the x axis which passes through the point O and the centre of the detector, and the direction Oy defines the y axis which indicates the planar surface 6b of the lens.

It will be assumed that the incident beam FI strikes the surface 6b at an angle of incidence α at an abscissa point X=0 and with the ordinate Y.

After refraction and propagation in the material of index n constituting the lens, the beam strikes the aspherical surface 6a at a point having the coordinates (x, y).

The beam then reemerges from the lens at an angle η and strikes the detector at a point having the coordinates (X=a+b, $y_{D^*}$) where a is the minimum thickness OB of the lens, and b is the distance which separates the point B on the surface 6a from the center of the sensitive area 4 of the detector.

The aspherical surface 6a is then defined by the following four equations:

A first equation which describes the ray between the surface 6b and the surface 6a (equation no.1 of Annex I).

A second equation which describes the ray between the surface 6a and the detector 4 (equation No.2 of Annex I).

A third equation which defines the angle of the beam on emerging from the aspherical surface 6a (equation No.3 of Annex I).

A fourth equation which defines a representative function of the variation of the photocurrent to be compensated (equation No.4 of Annex I).

This fourth equation is obtained from the derivation of the first and second equations, and by introducing the function F(α):

$$F(\alpha) = \frac{\text{current coming from the detector for any value of } \alpha}{\text{current coming from the detector for } \alpha = 0}$$

In equation No.4 of the Annex, the coefficient k is a constant determined by the designer of the lens. The most favorable condition is obtained when k=1.

These equations make it possible, if necessary, to take into account the reflectivity of the surface of the detector according to the angle of incidence, if it is assumed that the detector is a simple energy-absorbing device, which is in particular the case with, for example, silicon technology detectors These equations are valid for lenses with a cylindrical symmetry, which is the case with modern lenses, including spherical lenses, to the extent that the sensitive detection area is very small as compared with the other dimensions of the device, and in particular as compared with the diameter of the lens.

On the basis of the four above mentioned equations, several formal or digital procedures may be used for deducing therefrom the profile of the aspherical surface 6a of the lens.

One of these methods, which will be described below, is particularly advantageous and has been developed specifically for resolving this particular problem, but which can be adapted to other problems, and in particular those for which a partial derivative continuity has to be ensured.

This procedure is of the digital type.

Start with a horizontal incident beam superimposed on the Ox axis (y=0, β=0, x=a). This beam is translated parallel to the Ox axis until it reaches the ordinate $y_D$=D1/2. The new values of α and x'/y' are then determined.

Inserting $y_D$=−D1/2 in equation (2), it is possible to deduce therefrom the angle η on emergence from the aspherical surface 6a, since x and y are known (continuity of the points). Knowing η, a first relation between α and x'/y' may be derived from equation (3).

As a first approximation, the derivation of equations (1) and (2) for a constant α, and the introduction of the results previously obtained in equation (4), make it possible to deduce therefrom x'/y' in terms of α (equation (5) of the Annex I). This gives a second equation between α and x'/y'.

Thus, there is a system of non-linear equations which are digitally solved for deducing therefrom the new pair (α, x'/y'). Δy, which represents the pitch of the digitization between two adjoining beams, is then deduced therefrom (equation (6) of Annex I).

Y=Y+Δy and x=x+(x'/y') . Δy are then substituted in this equation.

Return then to the step where $y_D$=−D1/2 had been inserted until the sought interval of the angles α is obtained.

Other algorithms, which take into account the variation of x'/y' when the rays are displaced with a constant α, can be used but they are superfluous when working with the hypothesis of a small detector.

The transmitter-receiver device illustrated in FIG. 2 comprises a star T, for example the planet earth, wherein transmitter-receiver stations S-i, are installed in a fixed position and a satellite SAT is disposed in a low orbit around the earth T.

Each station S-i has a transmitter-receiver antenna 10 intended, on the one hand, to transmit beams of electromagnetic entry waves FI in the direction towards the satellite SAT and, on the other hand, to receive beams of electromagnetic waves FR coming from the satellite.

The satellite SAT therefore not only has a receiver device 1 in accordance with the invention for receiving the entry beams FI coming from the stations S-i, but also a transmitter (not shown in FIG. 2) intended to transmit the beams FR in response to the detection of a beam FI.

When tracking the satellite in real time, the transmitted electromagnetic waves are of the pulsed type and the spectral range is the optical range centered on the frequency of $5.10^{14}$ Hz (visible and infrared). These waves can therefore be associated with photons having energies between approximately 1.5 eV and 3 eV. A beam transmitted by a station can therefore be likened to a burst of photons spread over a temporal range of approximately 10 ps to 100 ps.

The detector 3 used for receiving these photons is, for example, a photodetector intended to measure the photocurrent associated with a burst of photons.

But it is clear that, depending on the applications, it is possible to use other types of detectors.

The tracking of the satellite SAT by the stations S-i will be described below.

The transmitter 10 of each station S-i is mounted for rotation to be capable of following the satellite SAT in an angular range of approximately 180°. The guidance of this transmitter 10 is ensured by processing means which the trajectory of the satellite. Thus, when the satellite is in the field of action of a station, it is possible to point the main transmission axis 13 of the transmitter 10 towards the center of the detector 3.

The receiver device 1 of the satellite remains permanently orientated towards the earth, so that the main detection axis 14 permanently points towards the center C of the earth T.

The stations S-i and the satellite SAT, respectively, have an atomic-type clock. All these clocks are synchronized relative to a reference time. Moreover, the intersection between the transmission spaces of two adjoining stations S-1 and S-2 is not zero, which makes it possible to track the satellite continuously.

At a given instant, one or several stations transmit bursts of photons forming incident entry beams FI. Each incident beam is emitted by a laser. Although the beam is collimated it nevertheless has a slight divergence represented in FIG. 2 by the angle ($\beta$). However this divergence is very small; it is therefore possible to liken the beam to a cylinder with diameter D2.

The entry beam FI arrives at an angle of incidence ($\alpha$) relative to the main detection axis 14. This entry beam FI which, in a first approximation, is therefore likened to a cylinder with diameter D2, then passes through the planar surface of the lens 6 at the void-lens interface, where it is subjected to a first refraction, then it passes through the aspherical surface at the lens-void interface, where it is subjected to a second refraction.

Reference will now be made to FIGS. 1 and 3 to describe in greater detail the action of the lens on an entry beam FI.

The first refraction only deflects the whole beam since, on the one hand, the glass-lens interface is planar and since, on the other hand, the material of which the lens is made is homogeneous. Generally, this material is glass. Since the refractive index of glass is greater than the refractive index of empty space, the entry angle of incidence $\alpha$ is reduced by this first refraction which follows the Descartes-Snell laws. The deflection depends on the angle of incidence, which means that a beam FI parallel to the main detection axis 14 will not be deflected by the first refraction. This particular case is illustrated in FIG. 3.

The second refraction on the lens-void interface does not have the same effect as the first refraction.

Its purpose is to compensate the losses of intensity sustained by an entry beam FI when it passes through space, these losses depend on its angle of incidence, as has been explained above.

Indeed, the greater the entry angle of incidence ($\alpha$) of the entry beam FI, the more remote the satellite is from the transmitter station, and therefore the larger is the layer of air is which the entry beam FI passes through. Now the larger this layer, the more the intensity of the signal decreases by an absorption and/or diffusion effect by, or on, the molecules which occupy this space.

Consequently, the aspherical surface must keep the intensity detected by the sensitive area 4 substantially constant, whatever the entry angle of incidence ($\alpha$), so that the signal-to-noise ratio which is delivered by the photodetector to the processing means of the satellite virtually does not change from one burst to another.

The mechanism authorizing this compensation phenomenon will be explained below.

As has also been stated above, an entry beam FI may be likened to a multiplicity of photons which follow substantially parallel paths. Consequently at the lens-void interface 6a, each photon of a beam FI will be subjected to a second refraction which will be specific to it, since it will be the result of the combination of (i) the angle of incidence at the lens-void interface and (ii) the curvature of the surface 6a at the point where the photon passes through the aspherical surface 6a. In other words, a multiplicity of different refractions will be associated with a multiplicity of photons.

Thus, knowing the law of the absorption of the intensity of the beam according to the angle of incidence, it is possible to calculate the exact profile of the aspherical surface, so as to very precisely control the path of each photon of the entry beam FI.

In other words, knowing the law of absorption of the entry beam FI makes it possible to deduce therefrom a given correction formula that is appropriate to the set problem.

According to the invention, the profile of the aspherical surface 6a is thus calculated so that an entry beam FI which is collimated and therefore likened to a cylinder, arriving on the lens 6 emerges from the lens in the form of a divergent, convergent or collimated incident beam FO, depending on the entry angle of incidence ($\alpha$).

Thus, transforming a collimated incident entry beam FI into a convergent incident beam FO considerably increases the probability that the photons contained therein will be detected by the sensitive area 4. On the other hand, transforming a collimated incident entry beam FI in a passive manner into a divergent incident beam FO will considerably reduce the probability that the photons contained therein will be detected by the sensitive area 4.

In this way, it is possible to keep substantially constant the number of photons detected by the sensitive area in each burst, since the intensity of a beam is proportional to the number of photons contained therein.

Once the burst has been detected, the processing means of the satellite are capable of retransmitting, in response, one or several bursts in the form of a beam FR in the direction towards the station or stations which are situated in its transmission zone. After the processing, the station, or stations, are then capable of deducing therefrom, virtually in real time, the very precise position of the satellite.

The device in accordance with the invention can be installed in a satellite for reception, as has been described above, but it is clear that it can be installed ahead of the receiving part of a station, fixed or not, since it is in fact the relative movement of a first element relative to a second element that will produce the variation of the angle of incidence.

The invention is not restricted to the embodiment described above, wherein the lens only comprises a single aspherical surface which is sufficient when the angle of incidence is the only variable parameter.

Thus for more complex applications, one may be led to use a lens provided with two aspherical surfaces. This may be the case when a receiving element is displaced relative to a transmitter element in a three-dimensional reference system (volumic space), each element being defined in this reference system by three spherical coordinates (r, $\theta$, $\phi$).

Moreover, this correction device may be used for the tracking on earth of certain independent or certain remotecontrolled vehicles which require a very precise location of the order of a centimeter.

Finally, in the preceding description, reference has always been made to pulse-type "optical" signals. It is obvious that the invention also applies to continuous optical signals. Similarly, it may be envisaged to use it for the detection of radioelectric waves, on condition that the diameter of the receiving antenna is very large as compared with the wavelength used.

ANNEX I

A) Equations permitting the calculation of the aspherical surface $$y - Y + x \cdot tg\left(\text{acrsin}\left(\frac{\sin(\alpha)}{n}\right)\right) = 0 \quad \text{Equation n° 1}$$

$$Y_D = y - (a + b - x) \cdot tg(\eta) \quad \text{Equation n° 2}$$

$$\eta = \text{arc}tg\left(\frac{x'}{y'}\right) - \quad \text{Equation n° 3}$$

$$\text{acrsin}\left(n \cdot \sin\left(\text{arc}tg\left(\frac{x'}{y'}\right) - \text{arcsin}\left(\frac{\sin(\alpha)}{n}\right)\right)\right)$$

$$k \cdot F(\alpha) = \left(\frac{\partial y_D}{\partial Y}\right)_{(\alpha=\text{constant}, y_D=0)} \quad 0 < k \leq 1 \quad \text{Equation n° 4}$$

B) Equations for the digitization procedure $$\frac{x'}{y'} = \text{constant} = \quad \text{Equation n° 5}$$

$$\frac{k \cdot F(\alpha) - 1}{tg(\eta) = k \cdot F(\alpha) \cdot tg\left(\text{arcsin}\left(\frac{\sin(\alpha)}{n}\right)\right)}$$

$$\Delta y = \frac{D1}{1 + tg(\eta) \cdot \frac{x'}{y'}} \quad \text{Equation n° 6}$$

I claim:

1. A device for receiving electromagnetic signals intended to detect an entry beam of electromagnetic signals of a known geometry arriving at a variable incident entry angle, the device comprising:

a detector having a sensitive detection area and a main detection axis serving as reference for the incident entry angle, the detector being a quadratic detector of the energy of an incident beam on a given sensitive detection area; and means for transmitting to the detector, in a specified angular range, the incident beam which is derived from the entry beam, the means for transmitting comprising means for correcting the geometry of the entry beam chosen according to a correction formula, the correction formula depends on the incident entry angle of the entry beam, the means for correcting forms the incident beam and transmits it to the sensitive detection area so as to reduce energy deviations of the received energy of the incident beam, whereby the signal to noise ratio of the electromagnetic signal is substantially constant regardless of the incident entry angle.

2. A device according to claim 1, wherein the electromagnetic signals of the incident entry beam have frequencies situated in an optical range, and the means for correcting is an optical lens having a profile predetermined according to the correction formula.

3. A device according to claim 2, wherein the lens has at least one aspherical surface orientated towards the sensitive detection area.

4. A device according to claim 2, wherein the lens comprises an aspherical surface orientated towards the sensitive detection area, and a planar surface on the opposite side of the aspherical surface.

5. A device according to claim 2, wherein the lens has a diameter which is greater than a largest dimension of the sensitive detection area.

6. A device according to claim 1, wherein the correction formula is chosen also according to both the geometry of the incident entry beam and the geometry of the sensitive detection area.

7. A device according to claim 1, wherein the detector and the means for transmitting are accommodated in a moving object.

8. A device according to claim 7, wherein the moving object is a satellite which orbits around a star according to a known law of motion, and wherein the electromagnetic signals are transmitted by at least one transmitter station situated on the surface of the star.

* * * * *